United States Patent
Lee

(10) Patent No.: US 7,839,990 B2
(45) Date of Patent: Nov. 23, 2010

(54) SYSTEM AND METHOD OF GENERATING RING BACK TONE

(75) Inventor: Dong Kyu Lee, Kyeongki-do (KR)

(73) Assignee: LG Electronics Inc., Seoul (KR)

( * ) Notice: Subject to any disclaimer, the term of this patent is extended or adjusted under 35 U.S.C. 154(b) by 1121 days.

(21) Appl. No.: 10/659,854

(22) Filed: Sep. 10, 2003

(65) Prior Publication Data

US 2004/0081304 A1    Apr. 29, 2004

(30) Foreign Application Priority Data

Oct. 7, 2002    (KR) .................. 10-2002-0061051

(51) Int. Cl.
*H04M 3/42* (2006.01)
*H04L 12/66* (2006.01)

(52) U.S. Cl. .................. 379/207.16; 379/201.01; 370/352

(58) Field of Classification Search .............. 370/352; 379/201.01, 207.02, 207.16
See application file for complete search history.

(56) References Cited

U.S. PATENT DOCUMENTS

| | | | |
|---|---|---|---|
| 5,202,912 A * | 4/1993 | Breeden et al. ............. 455/465 |
| 5,233,641 A * | 8/1993 | Maeda ....................... 455/567 |
| 5,661,790 A | 8/1997 | Hsu | |
| 6,393,113 B1 * | 5/2002 | Karras ......................... 379/133 |
| 6,594,485 B1 * | 7/2003 | Ezaki .......................... 455/417 |
| 7,075,951 B1 * | 7/2006 | McClary ..................... 370/528 |
| 7,457,278 B2 * | 11/2008 | Son et al. ..................... 370/351 |
| 2002/0080777 A1 | 6/2002 | Gaiser et al. | |
| 2002/0080797 A1 | 6/2002 | Kim | |
| 2002/0085532 A1 | 7/2002 | Kim | |
| 2003/0002476 A1 * | 1/2003 | Chung et al. ................. 370/352 |
| 2004/0028034 A1 * | 2/2004 | Greis ........................... 370/352 |

FOREIGN PATENT DOCUMENTS

| | | |
|---|---|---|
| CA | 2376985 A1 | 12/2000 |
| JP | 2001-345803 | 12/2001 |
| KR | 10-2002-0048173 | 6/2002 |
| RU | 2121770 C1 | 11/1998 |
| RU | 2173028 C2 | 4/2000 |

\* cited by examiner

*Primary Examiner*—Rasha S Al Aubaidi
(74) *Attorney, Agent, or Firm*—Lee, Hong, Degerman, Kang & Waimey

(57) ABSTRACT

Disclosed are a method of generating and transmitting a ring back tone and a system thereof. The method of generating a ring back tone in a first terminal based on an internet protocol comprises identifying a type of a network to which a second terminal requesting a call setup belongs, generating ring back tone data to be transmitted to the second terminal according to the type of the network, inserting the ring back tone data into a response message to the call setup, and transmitting the inserted response message to the second terminal.

12 Claims, 4 Drawing Sheets

SYSTEM AND METHOD OF GENERATING RING BACK TONE

CROSS REFERENCE TO RELATED APPLICATION

Pursuant to 35 U.S.C. §119(a), this application claims the benefit of earlier filing date and right of priority to Korean Patent Application P2002-61051 filed on Oct. 7, 2002, which is hereby incorporated by reference herein in entirety.

BACKGROUND OF THE INVENTION

1. Field of the Invention

The present invention relates to a communication terminal and, more particularly, to a systems and methods of generating and transmitting a ring back tone.

2. Description of the Related Art

Generally, if a calling party dials to make a call using a wire or wireless phone, the calling party hears a ring tone for informing that a calling signal is being sent to a called party. This tone is, typically, referred to as a ring back tone.

When a call connection is attempted between communication terminals of a public switched telephone network (PSTN), a switching system of the terminal of the called party generates the ring back tone and transmits the ring back tone to the terminal of the calling party.

Referring to FIG. 1, a communication system using the conventional Internet Protocol phone (IP phone) is illustrated in a general communication network. A call connection method according to the E.164 standard of the PSTN is based on a method of connecting a calling party and a called party together using the phone number of the called party.

That is, if the calling party inputs a phone number of a specified called party, the PSTN establishes a communication path connecting the calling party and the specified called party using the phone number inputted by the calling party.

Distinct from a communication network constructed for the main purpose of voice communication such as the PSTN, a data communication network constructed for the purpose of data communication is classified into a local area network (LAN), wide area network (WAN), and the Internet, in accordance with its size. Most data communication networks transmit/receive data in the form of a packet in accordance with the characteristics of the data communication protocols implemented.

Voice may be also transmitted using a data communication network such as an Internet protocol (IP) network. Voice transmission using a commercialized packet data network is called a phone-to-phone service. For example, if a calling party 'a' connects to a data communication network of a neighboring IP telephone company 'A' through the existing PSTN and inputs the phone number of a called party 'b', the calling party 'a' is connected to a data communication network of another IP telephone company 'B' near the called party 'b' through an IP network, and the data communication network of IP telephone company 'B' connects the calling party to the called party 'b' through another PSTN.

Currently, a Personal Computer (PC)-to-PSTN phone and an IP phone-to-IP phone have been proposed. For further detail please refer to H.323 recommendation as the international standard for voice communication of PC-to-PC, PC-to-PSTN, and IP phone-to-IP phone.

The H.323 recommendation is the standard of the International Telecommunications Union—Telecommunication Standardization Sector (ITU-T) for transmitting multimedia video-conference data through a packet exchange type network such as a transmission control protocol/Internet protocol (TCP/IP).

Referring back to FIG. 1, if a calling party of a PSTN phone makes a phone call to a called party of an IP phone, the PSTN phone is connected to an IP network through a trunk gateway, and the trunk gateway is connected to the IP phone through a soft switch or an IP phone server in the IP network. That is, the connection between PSTN phone and IP phone is made through the path illustrated graphically as ①→②→③→④→⑤→⑥→⑦→⑧→⑨→⑩ in FIG. 1.

The IP phone server includes a gatekeeper, a proxy server, and a call controller. The gatekeeper, in accordance with the H.323 recommendation, takes charge of E.164/IP address translation, admission control, bandwidth control, call control, use of call routing/control resources, security function, etc.

The proxy server serves to store therein a call management request message received from a user agent (UA) such as call setup, call cancellation, call termination, etc., in a voice over IP (VoIP).

The proxy server simultaneously sends the call management request message to various addresses of session initiation protocol (SIP) registered and therefore the same user. Also, if a user agent's response to the call management request is received by the proxy server, the proxy server serves to transmit the best response to the user agent (UA), and to process the cancellation of other messages generated simultaneously.

The gateway connects a data communication network with a switched network such as the PSTN. Also, the gateway provides bandwidth/medium control and also protocol/medium conversion function. The gateway is a network point and serves as an entrance to another network, and may be classified into three kinds. That is, a trunk gateway for connecting switching systems, an access gateway for directly connecting terminals, and a residential gateway for home use.

A soft switch in FIG. 1 is the platform that serves as a bridge for other kinds of signaling systems, and controls various types of media gates. The soft switch is software that serves as a switching system in the existing packet switching network as an upper layer of the gatekeeper in the H.323 recommendation, and takes charge of an integrated private exchange on the Internet capable of integrally managing communication information such as voice, data, image, etc.

To provide a ring back tone toward the PSTN phone in case of making a call to an IP phone from the PSTN phone, the IP phone server or a soft switch connected to the IP phone should generate the ring back tone, but none of the IP phone server and the soft switch have a module for generating the ring back tone. As a result, the ring back tone cannot be transmitted to the PSNT phone.

Conventionally, in case of attempting call connection between IP phones, a calling party of IP phone mainly generates and provides a ring back tone to a user of the calling party, and in case of attempting the call connection from an IP phone to a PSTN phone, a gateway transmits a ring back tone to the IP phone.

Unfortunately, however, a trunk gateway for connecting the PSTN phone and the IP phone together does not have a module for generating the ring back tone. As such, the ring back tone cannot be sent to the PSTN phone from the IP phone.

Typically, in case of attempting the call connection between the PSTN phones, a mobile switching center of a called party generates and transmits the ring back tone. In case of connection between the IP phones, an access gateway generates and transmits the ring back tone to a calling party of the IP phone.

Otherwise, a called party of the IP phone itself generates the ring back tone and provides a calling party of the IP phone. Distinct from an access gateway connected to a terminal, a trunk gateway for connecting between the switching systems does not include a device for generating a ring back tone.

Unfortunately, in the current systems, when a call is made from a PSTN phone to an IP phone, a gateway between the PSTN and the packet data communication network may not generate the ring back tone. That is, since a trunk gateway for connecting between switching systems does not include a device for generating the ring back tone, a calling party of the PSTN phone may not hear any sound (i.e., calling signal). In other words, the calling party of the PSTN phone may not recognize whether the call attempt is in progress until a called party of the IP phone picks up the phone.

Consequently, when a call is made from an IP phone to a PSTN phone, a called party of the IP phone generates the ring back tone for itself. But when a call is made from a PSTN phone to an IP phone, a trunk gateway may not generate and transmit the ring back tone to a calling party of the PSTN phone.

Methods and systems are needed to provide a solution to the above-mentioned problems.

SUMMARY OF THE INVENTION

The present invention is directed to a communication terminal, and more particularly, to a method and system for communicating a ring back tone that substantially obviates one or more problems due to limitations and disadvantages of the related art.

A method of generating a ring back tone in a first terminal communicating based on an internet protocol, in accordance with one embodiment comprises identifying type of a network to which a second terminal requesting a call setup belongs; generating ring back tone data to be transmitted to the second terminal according to the type of the network; inserting the ring back tone data into a response message to the call setup; and transmitting the inserted response message to the second terminal.

The response message comprises at least one data packet communicated based on real-time transport protocol. In some embodiments, the method further comprises storing the ring back tone data; and reading the stored ring back tone data according to a first-in first-out method so as to insert the ring back tone data to the response message.

The type of the network is identified based on a specific message transmitted from the network, or a number of the second terminal. For example, the type of the network can be identified based on a prefix included in the number of the second terminal. Or, the specific message can inform that the network has no function for generating the ring back tone data. If the type of the network is a public switched telephone network, the first terminal generates the ring back tone data.

In accordance with another embodiment, a first terminal communication based on an Internet protocol comprises a decision section for deciding whether to generate ring back tone data after identifying a type of a network to which a second terminal requesting a call setup belongs; and a signal processor for generating the ring back tone data to be transmitted to the second terminal according to the type of the network and inserting the ring back tone data into a response message to the call setup.

The response message comprises at least one data packet based on real-time transport protocol, wherein if the type of the network is a public switched telephone network, the signal processor generates the ring back tone data. The first terminal may further comprise a memory for storing the ring back tone data, wherein the signal processor reads the stored ring back tone data according to a first-in first-out method so-as to insert the ring back tone data in the response message.

In some embodiments, a method for generating a ring back tone for terminals which are operated based on different communication protocols, comprises receiving a call setup message from an access point of a first network connected to a first terminal; inserting ring back tone data into a response message to the call setup message; and transmitting the inserted response message to the access point; wherein the ring back tone is reproduced from the response message at the access point. The response message comprises at least one data packet based on real-time transport protocol. Accordingly, if the type of the network is a public switched telephone network, the first terminal generates the ring back tone data.

A system for generating a ring back tone for terminals which are operated based on different communication protocols, comprises a first terminal in a first network; a second terminal in a second network, the second terminal generating ring back tone data in response to a request of call setup from the first terminal and inserting the ring back tone data into a response message based on real time transport protocol; and a connecting mechanism for transmitting a call setup message to the second terminal and re-producing a ring back tone from the response message, wherein the first terminal belongs to a public switched telephone network and the second terminal belongs to an Internet protocol network.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 2:
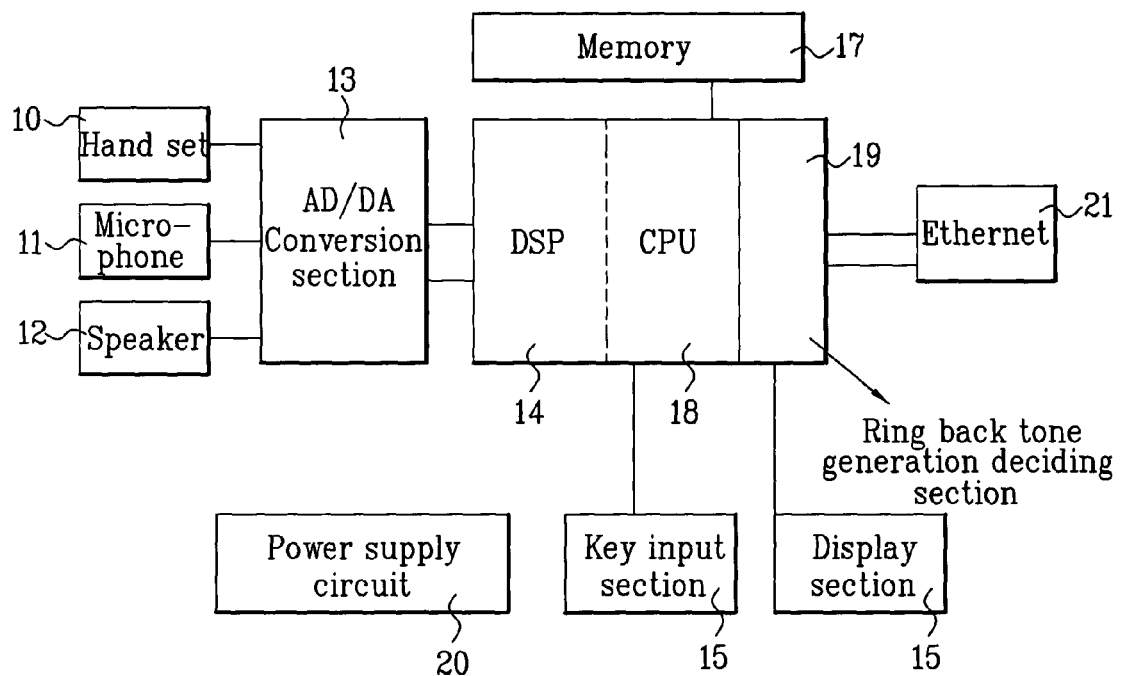
FIG. 2 is a block diagram of an IP phone with a ring back tone generating device according to a preferred embodiment of the present invention.

Referring to FIG. 2, in accordance with one or more embodiments of the invention, an IP phone comprises a handset 10 for transmitting/receiving a voice of a calling/called party, a microphone 11 and a speaker 12 which are used for transmitting/receiving the voice in addition to the handset 10, an analog-to-digital/digital-to-analog (AD/DA) conversion section 13, constructed among the handset 10, the microphone 11, the speaker 12, and a digital signal processor 14.

The digital signal processor 14 is for AD/DA-converting an analog signal to a digital signal and a digital signal to an analog signal. The digital signal processor 14 is electrically connected to the handset 10, the microphone 11, the speaker 12. The digital signal processor 14 also improves the reception of the IP phone and generating the ring back tone, in some embodiments.

The IP phone may also comprise a key input section 15 for inputting a phone number of a called party and/or other function keys thereon, a display section 16 for displaying the phone number and/or a current mode of the IP phone according to the other function keys, a memory 17 for storing commands information for operation of the IP phone, and a controlling section 18 for controlling the whole operation of the IP phone.

A ring back tone generation deciding section 19 is included, in one or more embodiments, for deciding to generate the ring back tone. A power supply circuit 20 is provided for supplying power to the IP phone, for example. Ethernet 21 is provided for connecting the IP phone and a computer communication network (i.e., IP phone server or Internet network in FIG. 1).

For the IP phone having the ring back tone generation device as constructed above according to the present invention, if a PSTN phone of a calling party (PSTN) dials to the IP phone as shown in FIG. 2, the call setup message is transmitted to the IP phone of a called party from a PSTN gateway (e.g., a trunk gateway).

Then, the ring back tone generation deciding section 19 determines whether to generate the ring back tone to the PSTN phone of the calling party after confirming a phone number of the PSTN phone of the calling party or confirming a specified message transmitted from the PSTN gateway. The ring back tone generation deciding section 19 informs the decision result to the controlling section 18.

The phone number of the calling party, in some embodiments, is that of any PSTN phone connected to the PSTN and is recognized by confirming the prefix of the PSTN phone number composed of a country code, area number, and phone number. Whether to generate the ring back tone is decided according to the confirmed prefix of the phone number.

Also, since the IP phone number is set for each area (or country), the ring back tone is not generated in case that the prefix of the IP phone number is confirmed. That is, the ring back tone generation deciding section 19 recognizes that the call connection is requested by, for example, a PSTN phone, an IP phone, or a mobile phone based on the prefix value of the phone number of the call setup message. Accordingly, the controlling section 18 is notified whether to generate the ring back tone in the IP phone.

In certain embodiments, if the specified message for informing the PSTN gateway of connection to the PSTN phone has no tone generating device in a transmission to the IP phone, the ring back tone generation deciding section 19 of the IP phone decides to generate the ring back tone, and accordingly informs the controlling section 18.

If it is decided that the IP phone itself generates the ring back tone based on confirming the prefix of a phone number of a calling party or confirming the specified message from the PSTN gateway, the controlling section 18 controls the digital signal processor (DSP) 14 to generate the ring back tone, and controls the buffer (i.e., memory) to store the ring back tone generated by the DSP 14.

Thereafter, when the response message in response to the call setup message is transmitted to the PSTN phone of a calling party, the controlling section 18 reads out the ring back tone from the buffer 17, inserts the ring back tone into the packet data, and transmits the inserted packet data to the PSTN phone through the Ethernet 21.

Meanwhile, the ring back tone generation deciding section 19 may be implemented by hardware or by software, but when implementing the ring back tone generation deciding section 19 by software, the ring back tone generation deciding section 19 may be implemented as an additional function of the controlling section 18.

Figure 3:
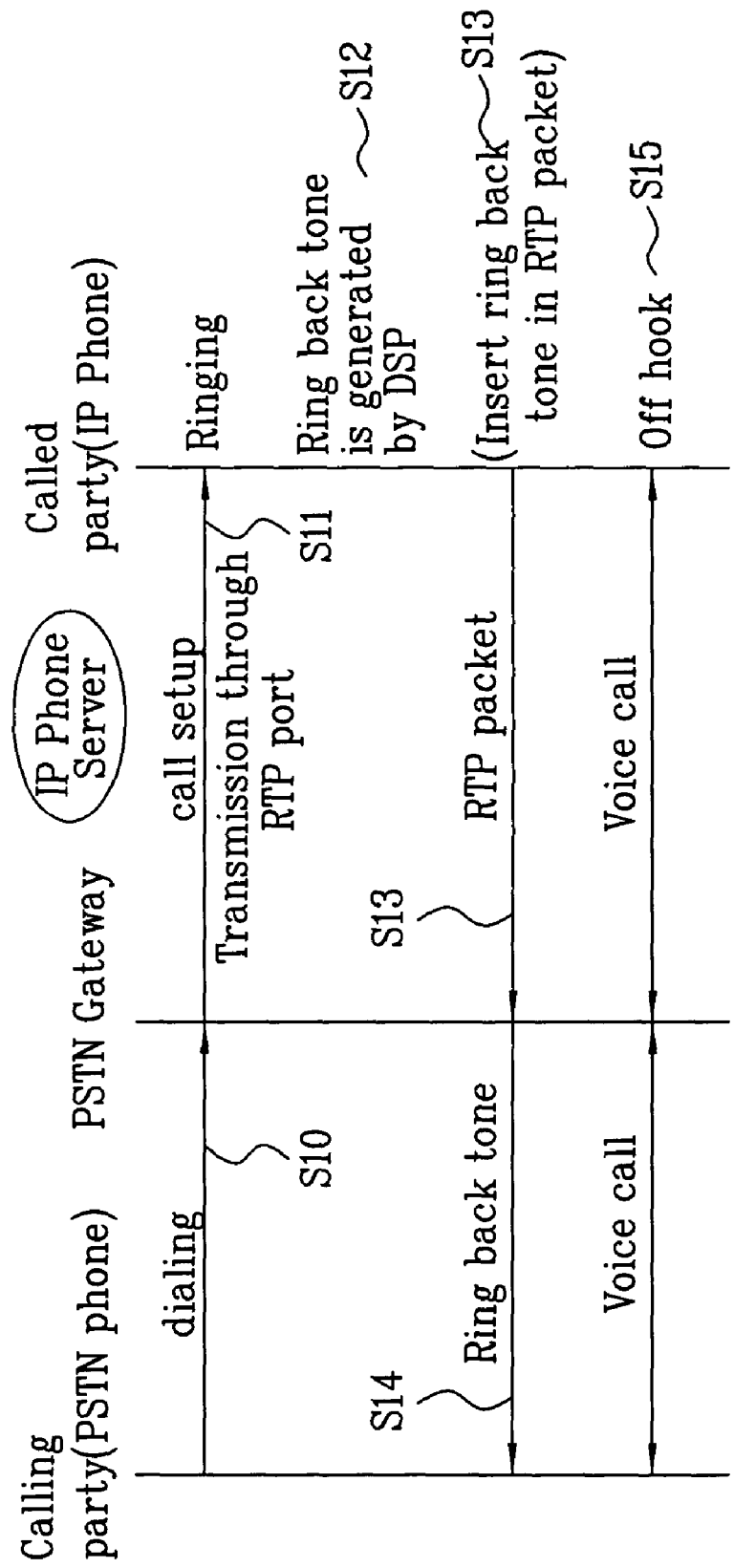
FIG. 3 is a flow diagram illustrating a ring back tone generating method for an IP phone according to a preferred embodiment of the present invention.

Referring to FIG. 3, in the present invention, an IP phone can include a ring back tone generating device for generating the ring back tone to transmit the PSTN phone of a calling party without any help of a PSTN switchboard or an access gateway. If a PSTN phone of a calling party dials to the IP phone of a called party, the PSTN gateway of the PSTN phone transmits a call setup message to the real-time transport protocol (RTP) port of an IP phone server including a proxy server, a gatekeeper, and a call controller and so on (S11), and a called party (e.g., an IP phone) receives the call setup message.

The system for connecting the PSTN and the IP network, (e.g., a gateway and/or a soft switch) informs information on its own port to the IP phone of a called party. Then, if the call setup message is received by the IP phone, a ring back tone generation deciding section 19 of the IP phone determines whether the call setup message is generated from the PSTN phone, and if so, a controlling section 18 of the IP phone controls for a DSP 14 to produce a ring back tone (S12). A buffer stores the generated ring back tone.

If the produced ring back tone is stored in the buffer 17, the IP phone transmits to the PSTN phone the response message (e.g., a type of a Real-Time Protocol packet) to the call setup message. The IP phone transmits the response message comprising the ring back tone to the port informed by the gateway and/or soft switch after reading out the ring back tone from the buffer 17.

That is, when the DSP 14 transmits the RTP packet to the PSTN phone to PSTN gateway and/or a soft switch, the DSP 14 inserts data of the ring back tone into a voice packet field of the RTP packet (S13). The gateway and/or the soft switch converts the RTP packet received from the IP phone into a signal capable of being recognized by the PSTN phone. The signal includes the ring back tone to be transmitted to the PSTN phone of the calling party(S14).

While the ring back tone is being transmitted to the PSTN phone, if the IP phone of the called party is hooked off (i.e., answered) (S15), a connection is established between the PSTN phone and the IP phone.

As described above, according to the present invention, the IP phone having the DSP 14 generates the ring back tone, and carries the ring back tone data on the RTP packet transmitted during a response message to a call setup message. Thus, the user of the PSTN phone may hear the ring back tone ring even though a trunk gateway does not generate the ring back tone.

Figure 4:
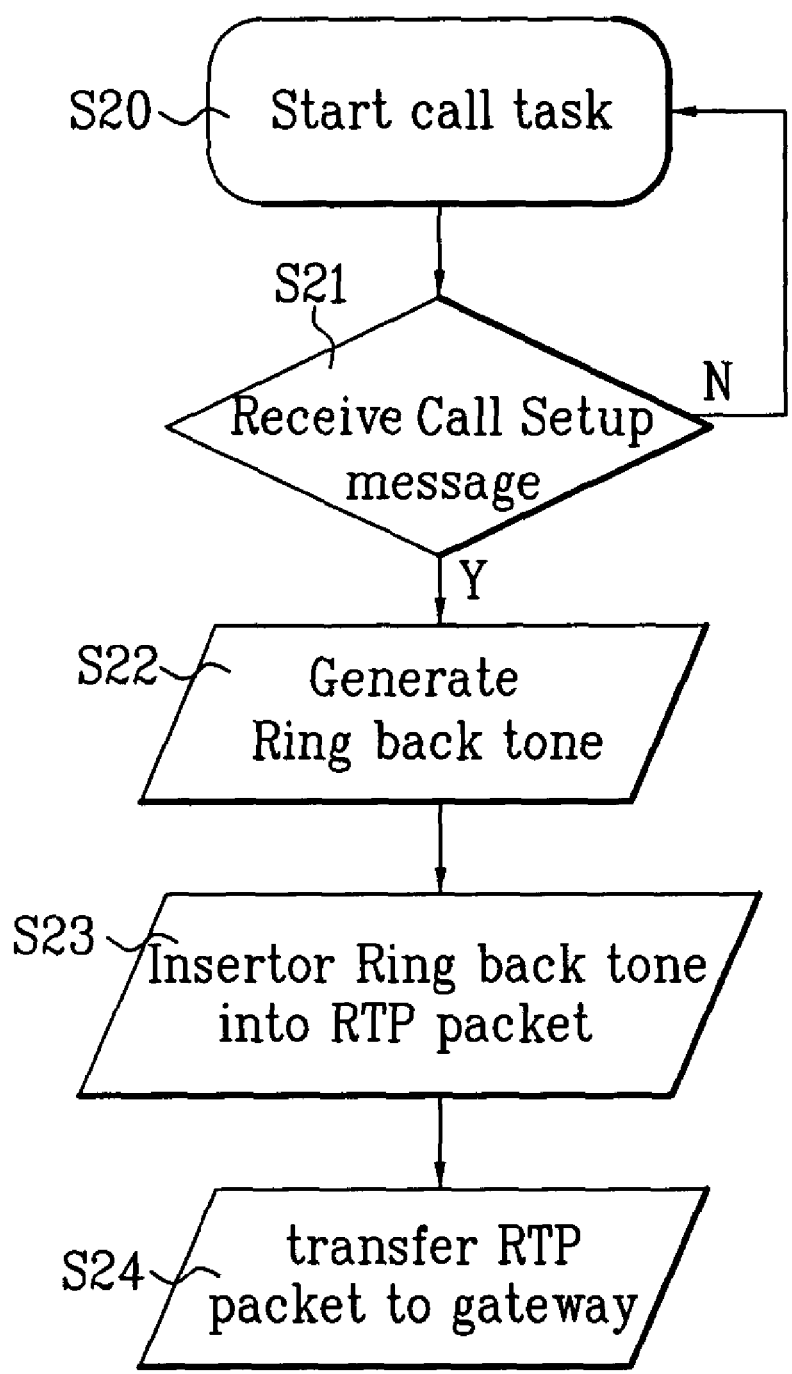
FIG. 4 is a flowchart illustrating a ring back tone transmission method using an RTP packet according to a preferred embodiment of the present invention.

Referring to FIG. 4, in one embodiment, in case that the call is made from the PSTN phone to the IP phone, the ring back tone is generated by the IP phone of a called party and transmitted to the PSTN phone of a calling party. IP phones of the called party may include any Internet access systems such as a cable modem, LAN, asymmetric digital subscriber line (ADSL), etc.

Figure 1:
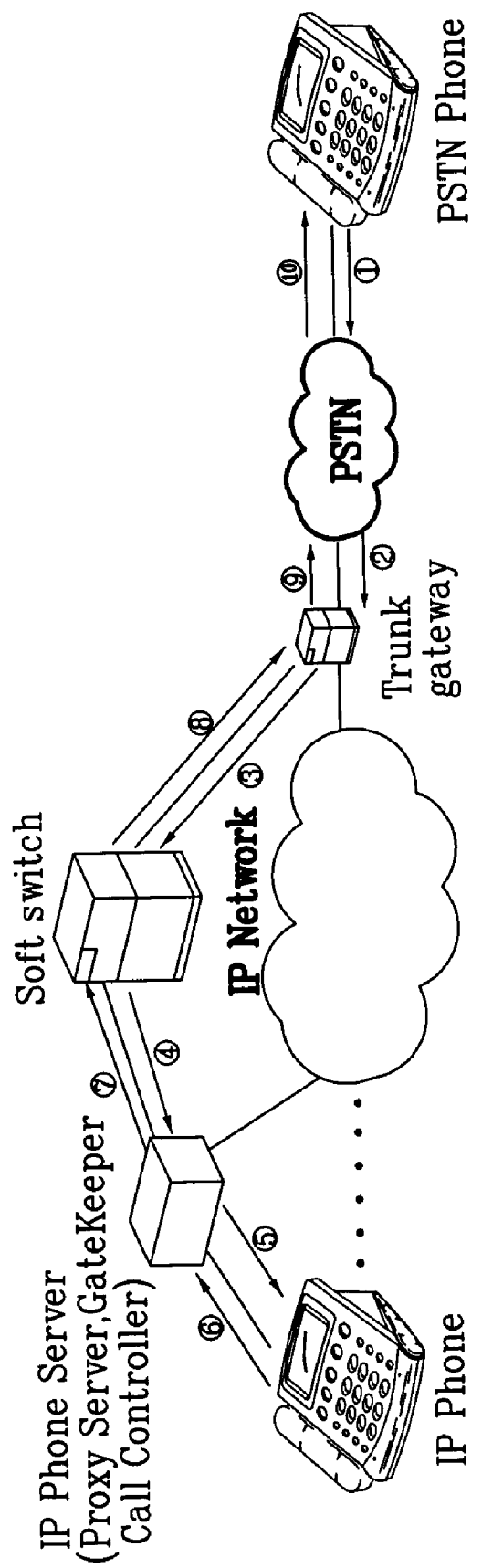
FIG. 1 is an exemplary diagram illustrating the common components of a general communication network connecting an IP phone; to a PSTN phone.

First, the network construction for making a call from the PSTN phone to the IP phone, as shown in FIG. 1, includes a PSTN phone of a calling party connected to the PSTN, a trunk gateway for connecting the PSTN and the IP network, an IP phone of a terminating party connected to the IP phone server (e.g., proxy server, gatekeeper, and call controller), and a soft switch serving as a switchboard of the IP phone server and the packet switching network of the trunk gateway.

The gateway is a network point that takes charge of an entrance to another network. The proxy server serves to store therein a call management request message received from a user agent (UA) such as call setup, call cancellation, call termination, etc., in a voice over IP (VoIP), and simultaneously sends the call management request message to various addresses of a session initiation protocol (SIP) registered here and there for the same user.

The soft switch is the whole platform that serves as a bridge with respect to other kinds of signaling systems, and controls various types of media gates. If the PSTN phone makes a call to the IP phone using the network as constructed above, it starts a call task for the call setup (step S20).

At this time, the systems for connecting the PSTN and the IP network, e.g., the gateway and the soft switch, insert a message for informing information on their own ports to the IP phone of the called party into the call setup message as they transmit the call setup message to the IP phone.

As described above, if the call task step is performed, the IP phone of the called party, determines whether the call setup message is received (step S21). If the call setup message is received, the DSP in the IP phone generates and stores the ring back tone in the buffer according as the call setup message requested by the PSTN phone (step S22).

After the generation of the ring back tone, the IP phone inserts the ring back tone data into the RTP packet (step S23), and transmits the RTP packet to the trunk gateway that is the network point in a FIFO manner (step S24).

The RTP packet transmited to the trunk gateway is converted into the ring back tone by the trunk gateway or the soft switch that is the bridge means, and the ring back tone is transmitted to the PSTN phone of the calling party.

The ring back tone is inserted in a response message to the call setup message, and then the response message is transmitted to the PSTN phone of the calling party through the transmission ports of the trunk gateway or the soft switch. In some embodiments, the terminal of the calling party is the PSTN phone or the phone connected to the gateway having no tone generating device.

The present invention as described above is not limited to the voice over Internet protocol (VoIP) for integrating the voice and data into a packet on the IP protocol and transmitting the packet in real time, but may be applied up to a session initiation protocol (SIP).

The SIP is one of the protocols for realizing the VoIP service, and has been developed by the Internet Engineering Task Force (IETF) as the next-generation protocol for the purpose of substituting for the H.323 standard technique adopted in the most commercial IP phone services currently provided.

The SIP is a call signaling protocol of an application layer that provides functions of a session setup, a session information exchange, a session release, etc., and is essentially required for developing diverse next-generation Internet applications such as the IP phone, multimedia messaging, etc.

As described above, according to the ring back tone transmitting method for an IP phone using a real-time transport protocol (RTP), the ring back tone may-be transmitted using the RTP packet from the called party even if the gateway equipment that may not generate the ring back tone is included in the connected network of the PSTN and the IP network.

Thus, a ring back tone is provided to the PSTN phone when making a call using a network that includes devices which may not generate the ring back tone, and thus the efficiency of the network construction can be increased.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A method of generating a ring back tone at a first terminal in communication with a second terminal, wherein the first terminal communicates over a first network implemented over voice over internet protocol (VOIP), and wherein the second terminal communicates over a second network connected to the first network, the method comprising:

identifying type of the second network over which the second terminal communicates to determine whether the second network expects to receive a ring back tone, in response to an attempt by the second terminal to establish a connection between the first terminal and the second terminal over both the first and second networks;

if the type of the second network over which the second terminal communicates is a PSTN, generating ring back tone data at the first terminal independent of any functions available at a public switched telephone network (PSTN) switchboard or an access gateway for generating the ring back tone;

storing the generated ring back tone data in a buffer of the first terminal; and inserting the ring back tone data into a response message forwarded from the first terminal to the second terminal after reading out the ring back tone data from the buffer;

wherein the ring back tone data is inserted into the response message according to a first-in first-out method, wherein the first network and the second network are connected by way of a trunk gateway, wherein the response message is transmitted to the second terminal through a port allocated for enabling communication between the first terminal and the second terminal by the trunk gateway during a call setup process initiated by the second terminal, wherein the second terminal receives the response message and locally generates a ring back tone by using the ring back tone data included in the response message, such that the second terminal generates the ring back tone by way of replaying the ring back tone data in the response message forwarded from the first terminal, without relying on functionalities within the first network or the second network to generate the ring back tone.

2. The method of claim 1, wherein the response message comprises at least one data packet communicated based on real-time transport protocol.

3. The method of claim 1, wherein the type of the second network is identified based on a specific message transmitted from the second network.

4. The method of claim 3, wherein the specific message indicates that the second network has no independent function for generating the ring back tone data.

5. The method of claim 1, wherein the type of the second network is identified based on a number of the second terminal.

6. The method of claim 5, wherein the type of the second network is identified based on a prefix included in the number of the second terminal.

7. A first terminal configured for communicating with a second terminal, wherein the first terminal communicates over a voice over internet protocol (VOIP) network, and the second terminal communicates over a non-VOIP network, the first terminal comprising:
- a decision section for deciding whether to generate ring back tone data according to a type of a network to which a second terminal transmitting a call setup request belongs;
- a signal processor for generating the ring back tone data independent of a public switched telephone network PSTN switchboard or an access gateway if the type of network is a PSTN-;
- a memory for storing the ring back tone data, and
- a controlling section for inserting the ring back tone data into a response message and transmitting the response message to the second terminal in response to the call setup request;
- wherein the VOIP and the PSTN networks are connected by way of a trunk gateway,
- wherein the signal processor reads the stored ring back tone data according to a first-in first-out method so as to insert the ring back tone data in the response message forwarded from the first terminal to the second terminal;
- wherein the response message is transmitted to the second terminal through a port allocated for enabling communication between the first terminal and the second terminal by the trunk gateway during the call setup,
- wherein the second terminal receives the response message and locally generates a ring back tone by using the ring back tone data included into the response message,
- such that the second terminal generates the ring back tone by way of replaying the ring back tone data in the response message forwarded from the first terminal.

8. The first terminal of claim 7, wherein the response message comprises at least one data packet based on real-time transport protocol.

9. The terminal of claim 7, wherein the type of the network is identified based on a specific message transmitted from the network.

10. The terminal of claim 9, wherein the specific message informs that the network has no function of generating the ring back tone data.

11. The terminal of claim 7, wherein the type of the network is identified based on a number of the second terminal.

12. The terminal of claim 11, wherein the type of the network is identified based on a prefix among the number of the second terminal.

* * * * *